(12) United States Patent
Yoshida

(10) Patent No.: US 8,083,291 B2
(45) Date of Patent: Dec. 27, 2011

(54) VEHICLE SEAT

(75) Inventor: Masami Yoshida, Shioya-gun (JP)

(73) Assignee: TS Tech Co., Ltd., Saitana-Ken (JP)

( * ) Notice: Subject to any disclaimer, the term of this patent is extended or adjusted under 35 U.S.C. 154(b) by 0 days.

(21) Appl. No.: 12/299,454

(22) PCT Filed: May 2, 2007

(86) PCT No.: PCT/JP2007/059399
§ 371 (c)(1),
(2), (4) Date: Aug. 21, 2009

(87) PCT Pub. No.: WO2007/126119
PCT Pub. Date: Nov. 8, 2007

(65) Prior Publication Data
US 2010/0045089 A1  Feb. 25, 2010

(30) Foreign Application Priority Data
May 2, 2006 (JP) ................... 2006-128129

(51) Int. Cl.
*A47C 7/36* (2006.01)
(52) U.S. Cl. ..................................... 297/408
(58) Field of Classification Search ............... 297/391, 297/408
See application file for complete search history.

(56) References Cited

U.S. PATENT DOCUMENTS

| 6,000,760 | A  | * | 12/1999 | Chung | 297/408 X |
| 7,322,646 | B2 | * | 1/2008 | Jammalamadaka et al. | 297/408 |
| 7,455,363 | B2 | * | 11/2008 | Chung | 297/407 |
| 2007/0164593 | A1 | * | 7/2007 | Brockman | 297/408 |
| 2007/0284929 | A1 | * | 12/2007 | Keller et al. | 297/408 |

FOREIGN PATENT DOCUMENTS

JP           200614950 A       1/2006

* cited by examiner

*Primary Examiner* — Anthony D Barfield
(74) *Attorney, Agent, or Firm* — Browdy and Neimark, PLLC

(57) ABSTRACT

A vehicle seat comprises a seat back, a seat bottom, a headrest mounted on an upper portion of the seat back. The headrest includes a reverse U-shaped support section having downwardly extending two pillars and a horizontal section which connects upper portions of the pillars with each other. A lock plate is fixed to the horizontal section. A headrest frame is provided with an engagement disk which is changed over between a lock position where the engagement disk engages with the lock plate to disable the headrest to rotate about the horizontal section, and an unlock position where the engagement disk disengages from the lock plate to enable the headrest to rotate around the horizontal section.

1 Claim, 4 Drawing Sheets

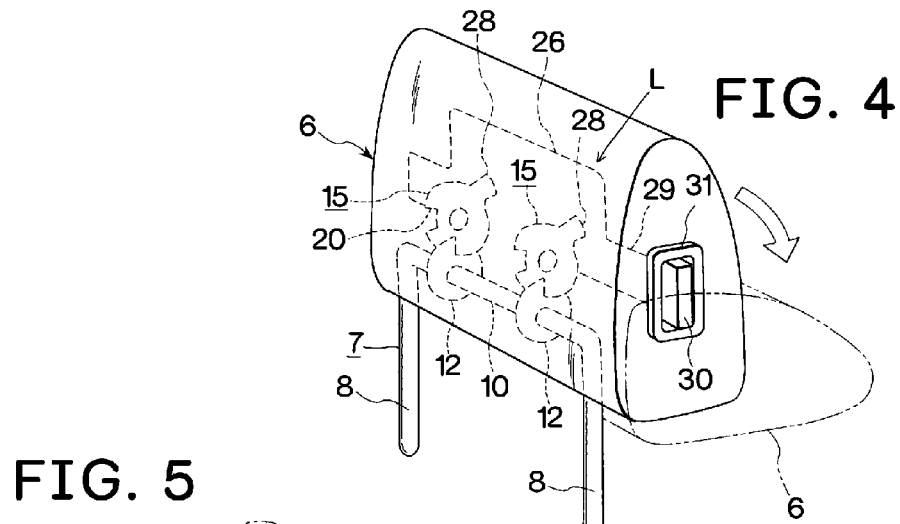
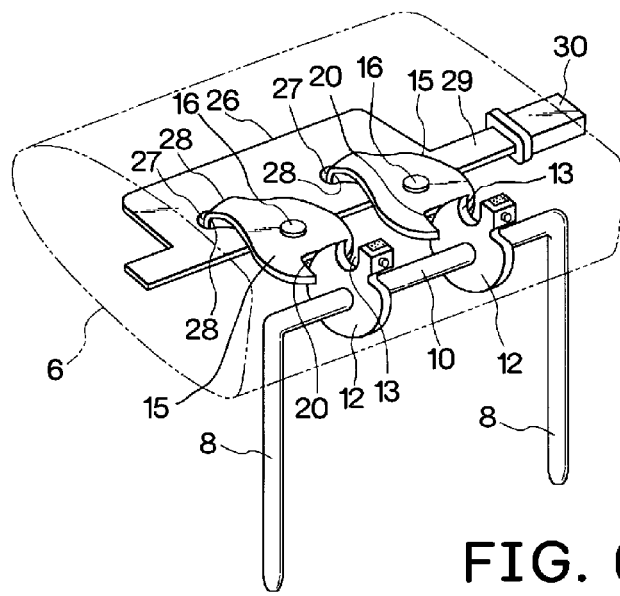
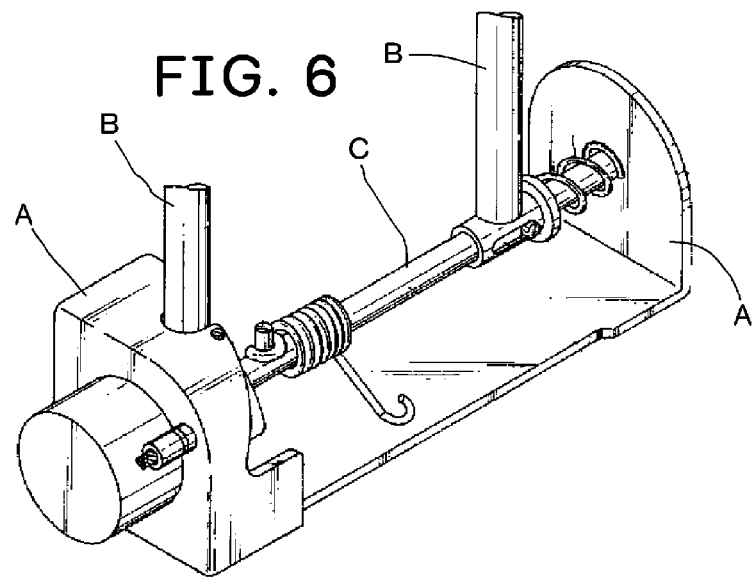

VEHICLE SEAT

TECHNICAL FIELD

The present invention relates to a headrest of a vehicle seat, and more particularly, to a mechanism for rotating the headrest between a use position and an accommodation position.

BACKGROUND ART

A conventional headrest provided on an upper portion of a seat back can rotate forward or backward. For example, an apparatus shown in FIG. 6 includes a base bracket A disposed inside of the seat back, and a pair of pillars B rotatably mounted on the bracket A. A headrest is fixed to upper portions of the pillars B.

Patent document 1: JP 7(1995)-11951A (U)

DISCLOSURE OF THE INVENTION

According to a conventional apparatus shown in FIG. 6, a headrest rotates around a horizontal rod C, but since the horizontal rod C is located inside a seat back, the seat back interferes with rotation of the headrest, and smooth rotation of the headrest can not be expected. Further, since the horizontal rod C is located inside the seat back, there is a drawback that a rotation radius of the headrest becomes long and a space required for rotation of the headrest is increased.

It is an object of the present invention to provide a vehicle seat in which a seat back does not interfere with rotation of a headrest when the headrest is rotated (when the headrest is accommodated).

It is another object of the invention to provide a vehicle seat in which a space required for rotating the headrest can be reduced in size.

BRIEF DESCRIPTION OF THE DRAWINGS

FIG. 4 is a perspective view of the headrest.

FIG. 5 is a perspective view of the headrest.

FIG. 6 is a perspective view of a conventional apparatus relating to the invention.

BEST MODE FOR CARRYING OUT THE INVENTION

Figure 1:
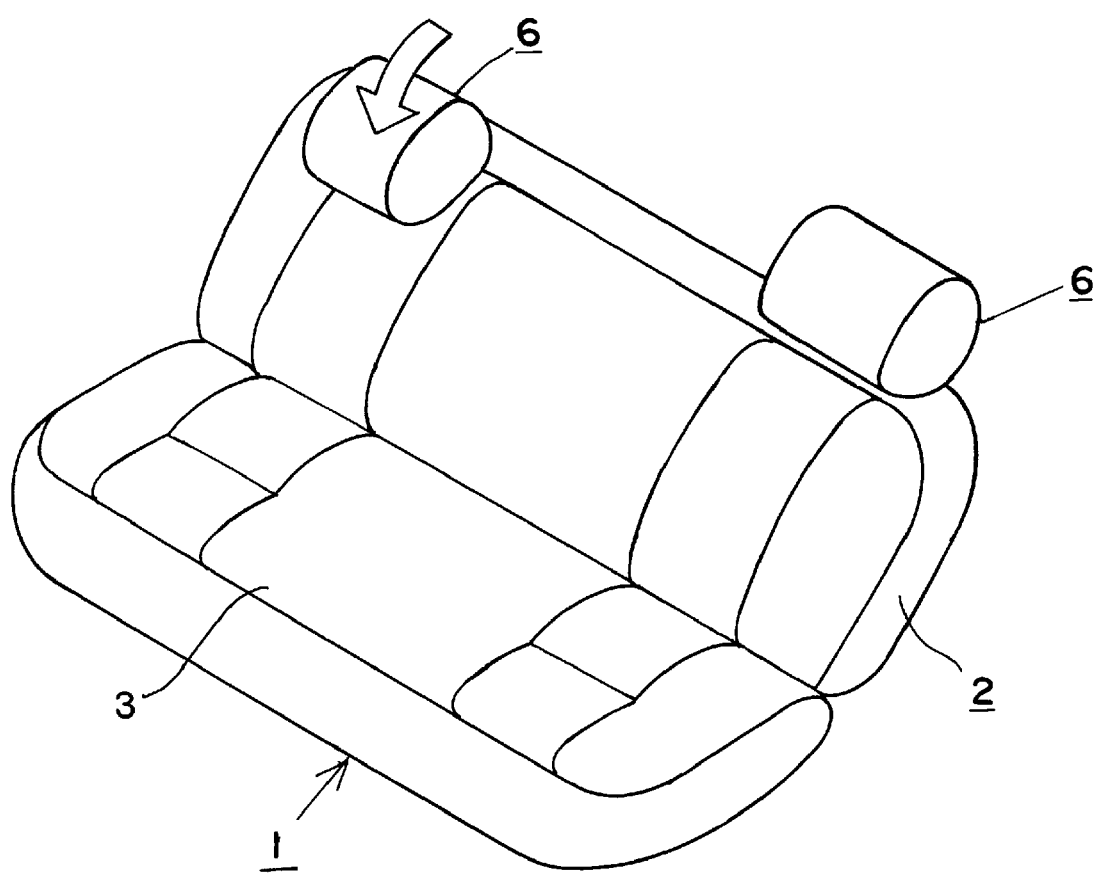
FIG. 1 is a perspective view showing a vehicle seat according to an embodiment of the present invention.

An embodiment of the present invention will be explained with reference to the drawings. A vehicle seat 1 of the invention includes a seat back 2, a seat bottom 3, and a headrest 6 provided on an upper portion of the seat back 2. The headrest 6 includes a reverse U-shaped support portion 7. The support portion 7 includes downwardly extending two pillars 8, and a horizontal section 10 which connects upper portions of the pillars 8 with each other. The pillars 8 are vertically slidably supported by the seat back 2.

A substantially square plate-like headrest frame 11 is provided inside of the headrest 6. The headrest frame 11 is surrounded by a cushion 56. The headrest frame 11 preferably includes a front plate 35 and a rear plate 36. The front plate 35 is formed at its peripheral edge with a front flange 37, and the rear plate 36 is formed at its peripheral edge with a rear flange 38.

A lower line of the front flange 37 is formed into a front arc mounting surface 41 which is fitted to the rod-like horizontal section 10. A lower line of the f38 is formed into a rear arc mounting surface 44 which is fitted to the horizontal section 10. The mounting surface 41 and the mounting surface 44 nip the shaft-like horizontal section 10, thereby preventing the headrest frame 11 from falling out from the support portion 7.

When a later-described lock mechanism L is in its unlocked state, the headrest frame 11 can rotate around the horizontal section 10, and when the headrest frame 11 rotates forward, the headrest 6 is accommodated in a front side of the seat back 2, and when the headrest frame 11 rotates backward, the headrest 6 is accommodated in a rear side of the seat back 2. However, when the lock mechanism is in its locked state, the headrest 6 is aligned with the seat back 2 substantially straightly. This position of the headrest 6 is defined as a use position.

A moving plate 26 which can slide in parallel to the horizontal section 10 is provided between the front plate 35 and the rear plate 36. The moving plate 26 is slidably supported by a plurality of front ribs 39 provided on the front plate 35 and a plurality of rear ribs 42 provided on the rear plate 36. The ribs 39 and 42 also have reinforcing functions of the plates 35 and 36.

Figure 3:
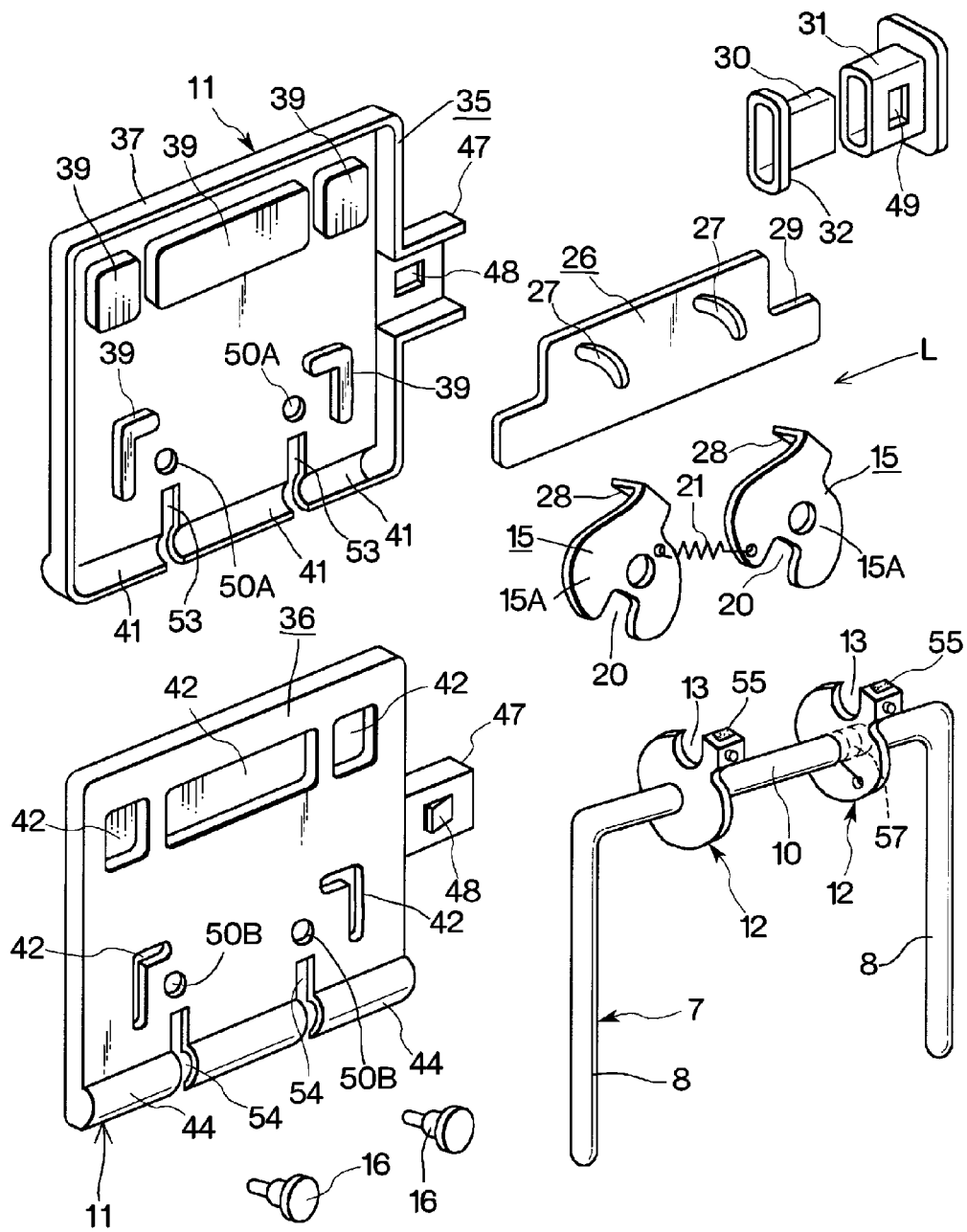
FIG. 3 is an exploded perspective view showing a headrest frame of the headrest and a lock mechanism.

An operating knob 30 is mounted on a side projecting portion 29 of the moving plate 26. The operating knob 30 is disposed in a guide passage opening 47 formed between the front plate 35 and the rear plate 36. A pawl 48 is provided in the guide passage 47, and the pawl 48 is engaged with an opening 49 of a garnish 31 which is inserted into the passage opening 47. If the opening 49 is engaged with the pawl 48, the garnish 31 is fixed in the passage opening 47. A position where a flange 32 of the operating knob 30 abuts against the garnish 31 is a right moving limit of the moving plate 26 in FIG. 3.

An engagement disk 15 is rotatably mounted on the headrest frame 11 by the support shaft 16. The support shaft 16 is inserted into an insertion hole 50A of the front plate 35 and an insertion hole 50B of the rear plate 36, and a shaft center of the support shaft 16 intersect with the headrest frame 11 at right angles. The engagement disk 15 includes a disk portion 15A which is parallel to the plates 35 and 36, and a bent portion 28 which is bent from a peripheral edge of the disk portion 15A substantially at right angles and extends in parallel to the support shaft 16.

The moving plate 26 is formed with an engaging hole 27 into which the bent portion 28 is inserted. If the moving plate 26 moves in the lateral direction, the bent portion 28 and the engaging hole 27 are engaged with each other, and the engagement disk 15 turns around the support shaft 16. A spring 21 is provided between the engagement disks 15, and the engagement disks 15 are biased in the clockwise direction in FIG. 3.

A lock plate 12 is fixed to the horizontal section 10. The lock plate 12 has a disk shape having a surface which intersects with the horizontal section 10 at right angles. The lock plate 12 includes a lock groove 13 which can engage with the engagement disk 15. The lock groove 13 has U-shape whose upper portion is opened, and if the engagement disk 15 engages with the lock groove 13, the headrest 6 is non-rotatably fixed to the seat back 2, and the headrest 6 is aligned with the seat back 2 substantially straightly and is held in the use position. A state where the engagement disk 15 engages with the lock plate 12 is the lock state of the lock mechanism L, and the position of the engagement disk 15 at that time is the lock position.

In the use position, the engagement disk 15 is biased by the elastic force of the spring 21 in the clockwise direction and with this, the moving plate 26 is biased rightward. If the operating knob 30 is pushed leftward, the moving plate 26 moves leftward, and the engagement disk 15 is rotated in the counterclockwise direction from the lock position. Then, an unlock notch 20 formed in the engagement disk 15 faces the lock plate 12, and the engagement disk 15 is brought into the unlock position. With this, the engagement between the engagement disk 15 and the lock plate 12 is released. This state is the unlock state of the lock mechanism L. In the unlock state, the headrest frame 11 can rotate around the horizontal section 10, and the headrest 6 can be accommodated in a front side or a rear side of the seat back 2.

The front plate 35 and the rear plate 36 respectively include slits 53 and 54 for avoiding interference with the lock plate 12.

Figure 2:
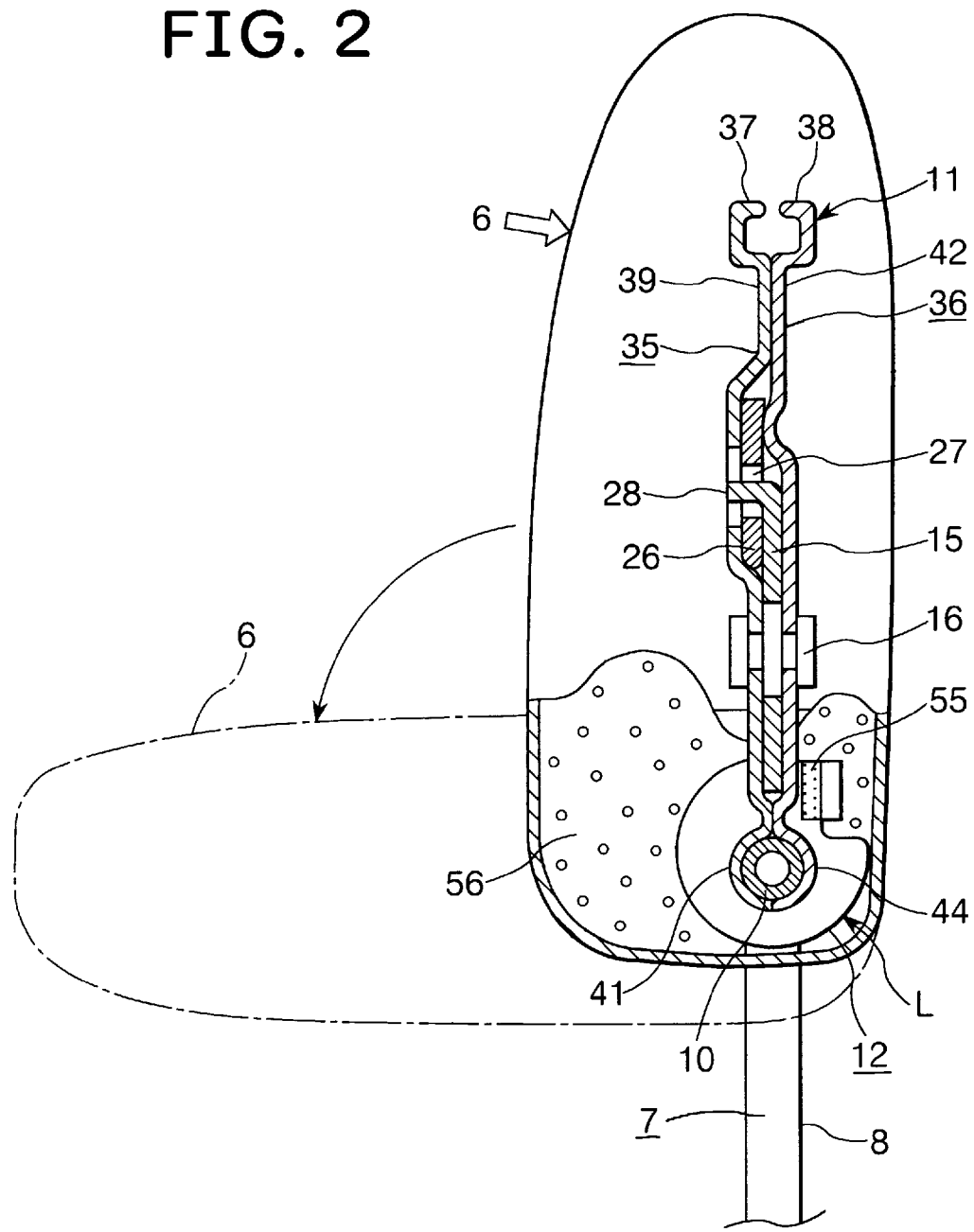
FIG. 2 is a vertical sectional side view of a headrest of the vehicle seat.

As shown in FIG. 2, a damper 55 is mounted on the lock plate 12. When the headrest 6 is rotated from the accommodation position to the use position, the damper 55 abuts against the headrest frame 11 and stops the headrest 6 at the use position. If desired, one end of the spring 57 is retained to the lock plate 12, and the other end of the spring abuts against the headrest frame 11. The spring 57 biases the headrest 6 toward the accommodation position.

According to the present invention, the headrest 6 rotates around the horizontal section 10 which is located inside of the headrest 6. Therefore, interference of the seat back 2 with rotation of the headrest 6 can be reduced.

Since the rotation radius of the headrest 6 is short, a space required for rotation of the headrest 6 can be reduced in size.

Since the moving plate 26 is slidably mounted on the headrest frame 11, the headrest frame 11 can be formed compact. Since the headrest 6 can be supported by the moving plate 26 and the headrest frame 11, the supporting strength of the headrest 6 can be enhanced without increasing the frame in size.

The invention claimed is:

1. A vehicle seat comprising:
   a seat back;
   a seat bottom;
   a headrest mounted on an upper portion of the seat back;
   wherein the headrest includes a reverse U-shaped support section having downwardly extending two pillars and a horizontal section which connects upper portions of the pillars with each other;
   wherein the headrest is mounted on the support section such that the headrest can rotate around the horizontal section;
   further comprising a lock plate fixed to the horizontal section;
   a headrest frame surrounded by a cushion provided in the headrest,
   wherein the headrest frame is provided with an engagement disk which is changed over between a lock position where the engagement disk engages with the lock plate to disable the headrest to rotate about the horizontal section, and an unlock position where the engagement disk disengages from the lock plate to enable the headrest to rotate around the horizontal section;
   wherein the engagement disk is rotatably mounted on the headrest frame, and the engagement disk includes an unlock notch which can not engage with the lock plate; and
   wherein the headrest frame includes a moving plate which can slide in parallel to the horizontal section, an end of the moving plate is exposed outside from the headrest, and if the exposed end is pushed, the engagement disk is changed over from the lock position to the unlock position.

* * * * *